3,311,427
COMBINED AXIAL AND ROTARY BEARING
Leo A. Toth and William H. Carter, South Bend, Ind., assignors to The Torrington Company, Torrington, Conn., a corporation of Maine
Filed July 10, 1964, Ser. No. 381,831
13 Claims. (Cl. 308—6)

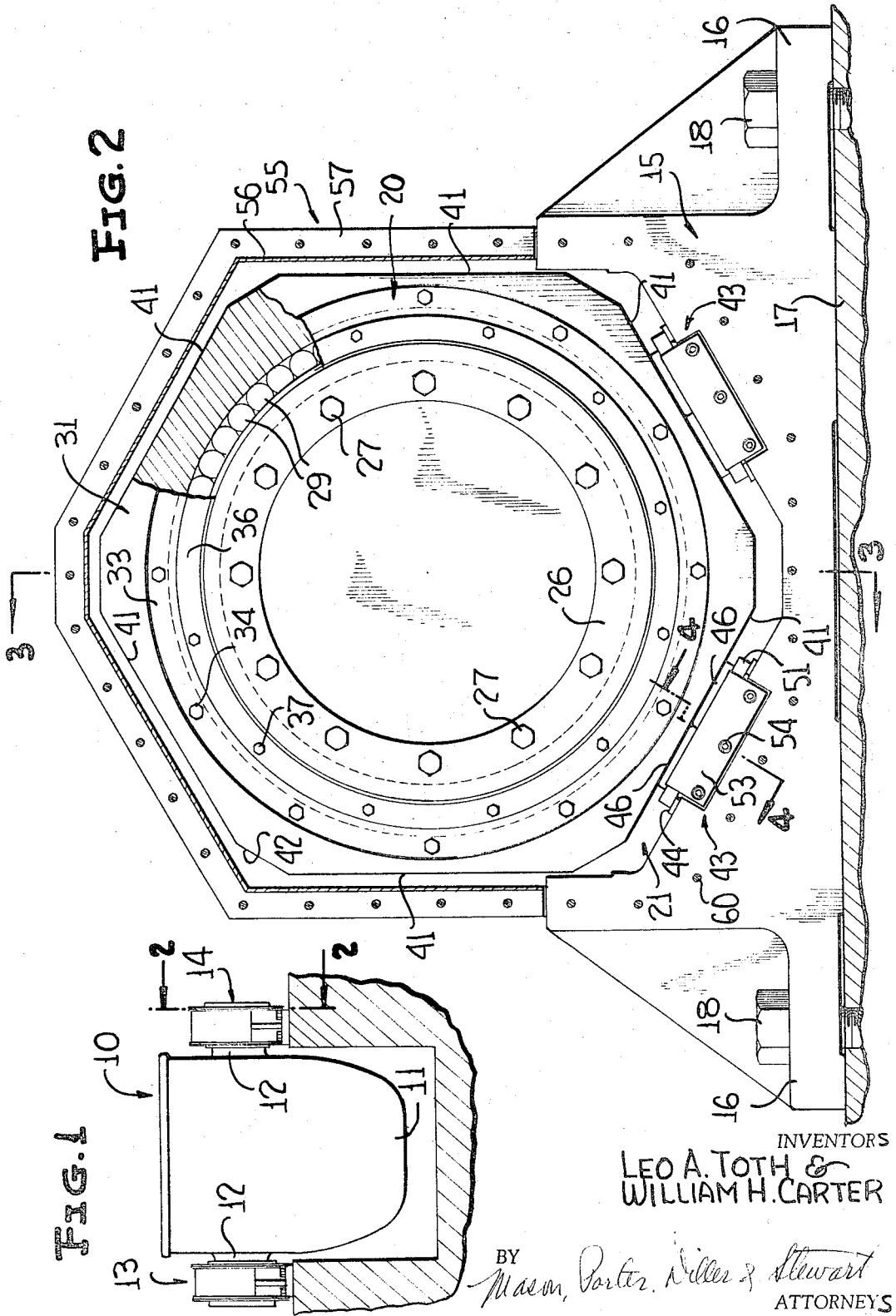

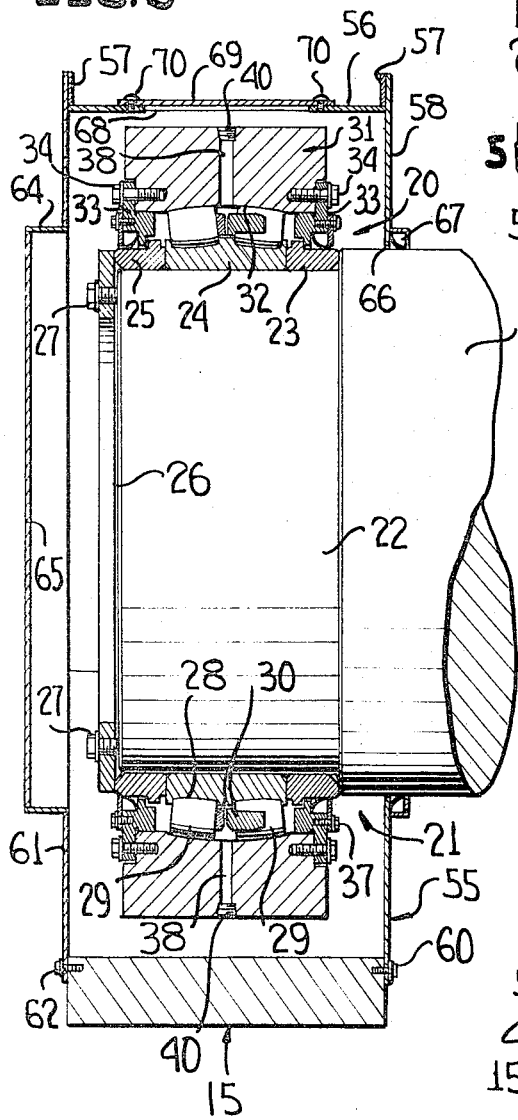
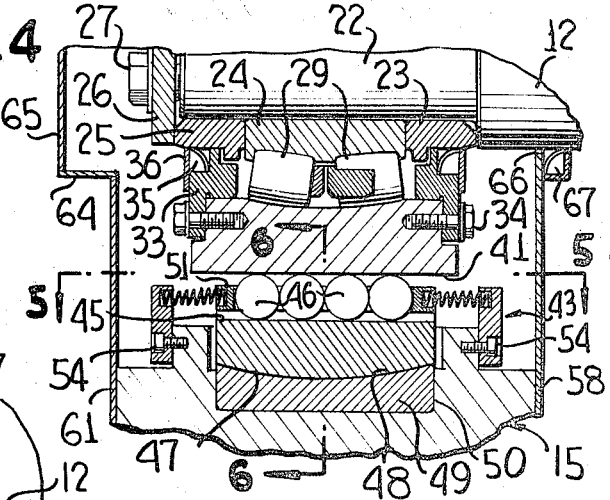
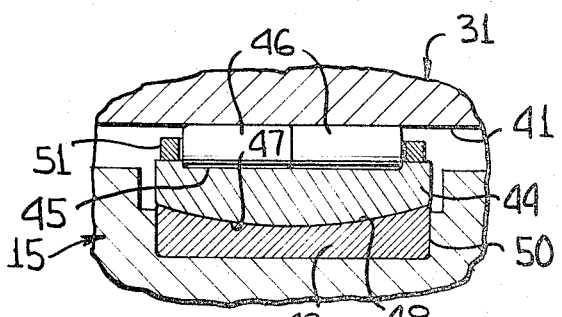

This invention relates in general to new and useful improvements in bearing constructions, and more particularly to a novel combined axial and rotary bearing for mounting a shaft for relative rotation wherein the shaft is subjected to axial movement.

In accordance with this invention, it is proposed to provide a bearing assembly which includes a rotary bearing unit for mounting a shaft for rotary movement, and an axial bearing unit which mounts the rotary bearing unit for movement axially of the shaft, the axial bearing unit being disposed between the rotary bearing unit and a support with the rotary bearing unit being held in place by gravity and the force exerted thereon by the associated shaft, and the axial bearing being of a nature to resist both overturning movement and transverse movement of the rotary bearing unit.

Another object of this invention is to provide an axial bearing unit for use in combination with a rotary bearing unit, the axial bearing unit including a polygonal cross sectional housing which forms part of the rotary bearing unit and which has adjacent pairs of race surfaces, the axial bearing unit also including a fixed support carrying other race surfaces which are automatically alignable with the race surfaces of the housing whereby rollers positioned between the two races surfaces will not be squeezed either longitudially of the rollers, or during movement longitudinally of the races due to any misalignment of the two races.

Still another object of this invention is to provide a combined rotary and axial bearing which includes a rotary bearing unit having a housing the exterior surface of which is of a polygonal shape and defining a plurality of pairs of adjacent race surfaces which are disposed at an included angle in excess of 90 degrees, the axial bearing unit also including a support which has races disposed parallel to the race surfaces of the housing, and the housing being selectively positionable with respect to the support whereby after a first used pair of races surfaces of the housing show signs of wear, the housing may be rotated to present two new races surfaces opposing the support.

Yet another object of this invention is to provide a novel race forming member for use as part of a combined rotary and axial bearing, the race forming member including an inner surface which defines an outer rotary bearing race, and an outer surface which defines an inner axial bearing race, the race forming member having an exterior polygonal outline and being selectively positionable with respect to two sets of linear movement antifriction bearing elements whereby as a first set of surfaces begin to show signs of wear, the race forming member may be rotated to present a new set of race surfaces, and at the same time the rotary bearing race thereof will be shifted in its position with respect to the load imposed thereupon to present different wearing surfaces.

A still further object of this invention is to provide a novel combined axial and rotary bearing for a terminal end of a shaft which is axially shiftable, the bearing including a shell in which there is positioned a rotary bearing receiving the end of the shaft, and the rotary bearing being mounted for limited axial movement within the shell by means of an axial bearing unit, the shell being completely sealed with the exception of a shaft receiving opening therein, and a seal defining the shaft receiving opening and forming a shell sealing seal with the shaft.

With the above and other objects in view that will hereinafter appear, the nature of the invention will be more clearly understood by reference to the following detailed description, the appended claims and the several views illustrated in the accompanying drawings.

In the drawings:

FIGURE 1 is a schematic elevational view showing a heavy furnace used in the manufacture of steel and incorporating at least one bearing formed in accordance with this invention.

FIGURE 2 is an enlarged fragmentary vertical sectional view taken along the line 2—2 of FIGURE 1 and shows generally the end construction of a bearing supporting the expansion end of the shaft or trunnion of the furnace.

FIGURE 3 is an enlarged fragmentary vertical sectional view taken along the line 3—3 of FIGURE 2 and shows further the details of the bearing including the sealed construction of the shell thereof.

FIGURE 4 is an enlarged fragmentary longitudinal sectional view taken along the line 4—4 of FIGURE 2 and shows more specifically the details of the rotary bearing unit and the constructional details of the axial bearing unit.

FIGURE 5 is an enlarged fragmentary sectional view taken along the line 5—5 of FIGURE 4 and shows the specific retainer construction for the rollers of the axial bearing unit.

FIGURE 6 is an enlarged fragmentary sectional view taken along the line 6—6 of FIGURE 4 and shows more specifically the details of mounting of the outer race of the axial bearing unit and the relationship of the rollers thereof with respect to the outer race.

Referring now to the drawings in detail, it will be seen that there is illustrated in FIGURE 1 a conventional furnace used in the making of steel, the furnace being generally referred to by the numeral 10 and including a furnace pot 11 which is supported indirectly through a ring or weldments by a pair of oppositely directed stub shafts 12. The shafts 12 are rotatably journalled within suitable bearing units 13 and 14 which may be alike, although it is necessary for only one of the bearing units to be of the end expansion type. It is to be understood that the furnace 10 will be equipped with suitable mechanism (not shown) for tilting the same between charging and discharging positions. However, as far as this invention is concerned, only the details of the bearing unit 14, which is of the combined axial and rotary type will be described hereinafter.

Referring now to FIGURES 2 and 3 in particular, it will be seen that the bearing unit 14 includes a generally U-shaped support 15 which is provided at the opposite sides thereof with hold-down flanges 16. The flanges 16 are suitably secured to a base 17 by means of bolts 18. The support 15 has mounted therein a rotary bearing unit, generally referred to by the numeral 20 which is movable axially of the stub shaft 12 within the support 15 and which is mounted for relative movement with respect to the suupport 15 by means of an axial bearing unit, generally referred to by the numeral 21.

For ease of description, the details of the rotary bearing unit 20 will be described first. Referring now to FIGURES 3 and 4 in particular, it will be seen that the stub shaft 12 is provided with an end portion 22 of a reduced cross section. A fillet spacer ring 23 is first slid over the reduced end portion 22, after which an inner race 24 is slid over the reduced end portion 22, followed by a further spacer 25. A clamp plate 26 is then secured to the end of the shaft 12 by means of bolts 27 so as to clamp the spacers 23 and 25 and the inner race 24 in place on the reduced shaft portion 22.

It will be seen that the rotary bearing unit 20 is of the self-aligning roller type. Accordingly, the race 24 has the outer surface thereof machined to define two raceways 28 for two rows of spherical rollers 29. The rollers of each row are retained in spaced relation by means of a retainer 30. The retainers 30 are of the toothed type or may be of the pin type and are disposed in back-to-back relation.

The rotary bearing unit 20 also includes an outer race forming member 31 which has the inner surface thereof machined to define a part spherical outer race 32 for the rollers 29. The inner part of the race forming member 31 is provided with a pair of side plates 33 which are secured in place by a plurality of circumferentially spaced bolts 34. Each of the side plates 33 is notched to receive a sealing ring 35 which is positioned by a clamp ring 36. The clamp ring 36 is secured in place by a plurality of circumferentially spaced bolts 37. The sealing rings 35 press against the spacers 23 and 25 and form seals therewith, thereby sealing the rollers 29 against foreign matter.

In order to facilitate the lubrication of the rollers 29, the race forming member 31 is provided with a least one lubricant passage 38 through which lubricant may be pumped into the area in which the rollers 29 are positioned. The lubricant passages 38 are normally closed by suitable plugs 40.

Referring once again to FIGURE 2 in particular, it will be seen that the race forming member 31 has a modified hexagonal configuration. The race forming member 31 has the exterior thereof defined by a plurality of surfaces 41 which are relatively wide and which are surfaces of a regular hexagon. However, the points which would normally occur with a regular hexagon have been removed and the surfaces 41 are spaced by relatively narrow flats 42 or turned chordal sections.

It is now pointed out that the race forming member 31, in addition to having an inner surface which defines the outer race for the rotary bearing unit 40, has a plurality of outer surfaces which form inner races for the axial bearing unit 21. However, the axial bearing unit 21 utilizes at one time only two of the race defining surfaces 41. Thus it might be said that the race forming member 31 has three selectively useable sets of race forming surfaces.

The axial bearing unit 21 has associated with each of the operative inner axial bearing races 41 a bearing assembly which is generally referred to by the numeral 43. The bearing assemblies 43 are best illustrated in FIGURES 4, 5 and 6. Each bearing assembly 43 is provided with an outer race defining member 44 which has an outer race surface 45 configurated to receive two rollers 46 in end-to-end relation. The race surface 45 is disposed parallel to the associated race surface 41 so as to prevent any wedging of the rollers 46 either transversely of the race defining member 44, as viewed in FIGURE 6 or longitudinally thereof as the rollers roll, as viewed in FIGURE 4. In order to assure that the outer axial bearing race 45 is parallel to the inner axial bearing race 41, the race defining member 44 is provided with an outer part spherical surface 47 which is seated on a like part mating spherical surface 48 of a seat member 49. The seat member 49 is seated within a recess 50 in the support 15.

It will be seen that the rollers 46 are arranged in pairs in end-to-end relation transversely of the race defining member 44 and that there are a plurality of pairs of rollers 46. The rollers 46 are disposed within a generally rectangular cage 51 which is mounted for limited movement transversely of the support 15. The movement of the cage 51 is resisted by a pair of springs 52 disposed at each end thereof and bearing both on the cage 51 and a pair of stop plates 53, which are secured to opposite faces of the support 15 by means of fasteners 54, as is best shown in FIGURE 4.

Referring once again to FIGURES 2 and 3 in particular, it will be seen that the support 15 forms the base of a shell which is generally referred to by the numeral 55. The shell 55 includes a frame 56 which extends upwardly from the upper ends of the support 15 in a generally inverted U-shaped arrangement around the race defining member 31 which also functions as a housing for the rotary bearing unit 20. The frame 56, as is best shown in FIGURE 3, is of a generally channel configuration and has outwardly directed flanges 57. An inner cover plate 58 is suitably secured to the inner flange 57 and to associated portions of the support 15 by means of a plurality of spaced bolts 60. An outer end plate 61 is secured to the outer flange 57 and the outer face of the support 15 by other bolts 62. The end plate 61 has a central projecting portion 64 which includes an end wall 65 so as to provide clearance for the associated portions of the rotary bearing unit 20. The end plate 58 is provided with a shaft receiving opening 66 through which the stub shaft 12 passes. A radial floating sealing ring 67 is carried by the end plate 58 and generally defines the opening 66. The sealing ring rides against the shaft and forms a seal therewith to exclude the interior of the shell 55 from the surrounding atmosphere. The upper part of the frame 56 is provided with an inspection port 68 through which a suitable lubricant may also be poured. The inspection port 68 is normally closed by means of a movable cover plate 69 which is secured in place by a plurality of fasteners 70. While the rotary bearing unit 20 is lubricated by a lubricant delivered to the interior thereof through the ports 38, it is to be understood that the rotary bearing unit 21 is of the submerged type and is lubricated by lubricant disposed in the lower part of the shell 55.

It will be readily apparent that the rotary bearing unit 20 will function in the normal manner to support the stub shaft 12 for rotary movement relative thereto. At the same time, it will be readily apparent that the axial bearing unit 21 will suitably support the rotary bearing unit 20 for movement axially of the shaft 12 in accordance with any end expansion of the shaft 12 due to the heating or cooling of the furnace 10. By placing each half of the axial bearing unit 21 in a manner wherein the effective planes of the individual bearing assemblies 43 thereof have an included obtuse angle therebetween greater than 90 degrees and less than 180 degrees, it will be seen that the overturning force exerted onto the race defining member or housing 31 of the bearing is resisted by the support 15 without there being any possibility of the overturning of the housing 31. Previously in bearings of this general type, the equivalent of the support 15 was provided with a flat surface on which two spaced bearing elements were mounted and the equivalent of the housing 31 was provided with a flat undersurface which paralleled the flat upper surface of the support. However, it will be readily apparent that such an arrangement did not properly support the housing 31 and the other components of the rotary bearing unit 20 against overturning during the rotation of the associated shaft 12. On the other hand, when the bearing elements 43 of the axial bearing unit 21 are mounted along two planes which are disposed in angular relationship to one another, accuracy of machining becomes an extremely difficult problem. This machining problem, however, is believed to have been solved with the components of the combined axial and rotary bearing 14.

It is readily apparent that in order to internally machine the housing 31, particularly when machining the inner race surface 32 thereof, the axis of the housing 31 is established. Then by indexing the housing 31 about this axis during the machining of the outer surface thereof, it will be readily apparent that all of the outer surfaces of the housing 31 will be parallel to the axis of the bore therethrough. Furthermore, because the housing 31 has a fixed axis at the time the outer surfaces thereof are being machined, it will be readily apparent that the outer surfaces may be accurately one with respect to the others so that the predetermined angular relationship between adjacent ones of the inner axial bearing races 41 is possible.

After the housing 31 has been machined, it is then necessary to obtain the necessary parallelism of the outer races of the axial bearing with respect to the inner races 41. This can be done by machining the surfaces of the support 15. However, this is extremely difficult. On the other hand, by mounting within the support 15 separate race defining member 44, it will be seen that the necessary parallelism can be obtained, particularly when the members 49 are utilized. At this time, it is pointed out that it is also feasible to directly mount the race defining members 44 directly on the support 15 and to adjust the positions thereof such as by shimming.

The particular external configuration of the housing 31 provides three sets of bearing races 41 on the outer surface of the housing 31. The fact that only one pair of bearing races 41 are used at a time does not make the other two pair of bearing races surplus in the broad sense of the word. It will be readily apparent that due to the loads involved, the bearing races 41 will be subjected to wear, as are the race defining member 44. When excess wear has taken place, then the housing 31 may be rotated so that two others of the bearing races 41 oppose the support 15. At the same time, if necessary, the race defining members 44 may be replaced.

The repositioning of the housing 31 does more than provide new inner races for the axial bearing unit 21. It is pointed out that a major portion of the load transmitted to the housing 31 from the stub shaft 12 is along the lower portion of the inner race 32 thereof. Furthermore, since the rotary bearing unit 20 is of the self-aligning type, it will be seen that except under extremely abnormal conditions, there will be a slight cocking of the axis of the stub shaft 12 with respect to the axis of the housing 31 with the result that the wear path on the race 32 lies generally in a plane disposed at an angle other than normal to the axis of the stub shaft 12. When the housing 31 is rotated to position another pair of bearing races 41 opposite the support 15, there will be a twisting of the inner race 32 with a resultant shifting of the wear pattern on the outer race 32. Thus, the rotation of the outer race 32 to a new position will change the wear pattern of the outer race 32 thereof and greatly increase the life of the outer race 32.

Although numerous advantages of the bearing of this invention have been specifically set forth and described herein, it is to be understood that there are many other advantages and that minor variations may be made in the bearing construction within the spirit and scope of the invention, as defined by the claims.

We claim:

1. A combined axial and rotary bearing comprising a support, a pair of upwardly facing outer axial bearing races on said support, said outer axial bearing races having an included angle therebetween materially greater than 90 degrees and materially less than 180 degrees, anti-friction bearing elements riding on said outer axial bearing races, a rotary bearing unit including a housing forming member having a linear polygonal outer surface defining a plurality of pairs of adjacent inner axial bearing races, the lowermost pair of said inner axial bearing races being parallel to respective ones of said outer axial bearing races and being supported by said bearing elements for axial movement while at least one inner axial bearing race is free of engagement with bearing elements, said housing being selectively positionable relative to said support to present another pair of said inner axial bearing races to said support when the currently used pair of inner axial bearing races become worn.

2. The bearing of claim 1 wherein said housing has an inner surface defining an outer rotary bearing race, said polygonal outer surface defining means for presenting another pair of said inner axial bearing races to said support when said housing is rotated a pre-determined amount and for simultaneously shifting said outer rotary bearing race to change the loading thereon.

3. The bearing of claim 1 wherein said outer axial bearing races are formed separately of the remainder of said support and are replaceably mounted.

4. A combined axial and rotary bearing comprising a support, a pair of upwardly facing outer axial bearing races on said suport, said outer axial bearing races having an included angle therebetween materially greater than 90° and materially less than 180°, anti-friction bearing elements riding on said outer axial bearing races, a rotary bearing unit including a housing forming member having a linear polygonal outer surface defining a plurality of pairs of adjacent inner axial bearing races, the lowermost pair of said inner axial bearing races being parallel to respective ones of said outer axial bearing races and being supported by said bearing elements for axial movement, said housing being selectively positionable relative to said support to present another pair of said inner axial bearing races to said support when the currently used pair of inner axial bearing races becomes worn; wherein said outer axial bearing races are formed separately of the remainder of said support and are replaceably mounted, each of said outer axial bearing races having a mounting which is rockable both axially and rotatably for alignment with opposing ones of said inner axial bearing races.

5. A combined axial and rotary bearing comprising a support, a pair of upwardly facing outer axial bearing races on said support, said outer axial bearing races having an included angle therebetween materially greater than 90° and materially less than 180°, anti-friction bearing elements riding on said outer axial bearing races, a rotary bearing unit including a housing forming member having a linear polygonal outer surface defining a plurality of pairs of adjacent inner axial bearing races, the lowermost pair of said inner axial bearing races being parallel to respective ones of said outer axial bearing races and being supported by said bearing elements for axial movement, said housing being selectively positionable relative to said support to present another pair of said inner axial bearing races to said support when the currently used pair of inner axial bearing races becomes worn; wherein said outer axial bearing races are formed separately of the remainder of said support and are replaceably mounted, each of said outer axial bearing races having a mounting which is rockable both axially and rotatably for alignment with opposing ones of said inner axial bearing races and said housing having an inner surface defining an outer rotary bearing race, said polygonal outer surface defining means for presenting another pair of said inner axial bearing races to said support when said housing is rotated a predetermined amount and for simultaneously shifting said outer rotary bearing race to change the loading thereon.

6. The bearing of claim 3, with said rotary bearing unit receiving and supporting one end of a shaft for rotary movement, and including a shell disposed about said axial and rotary bearing, said shell being closed except for a shaft receiving opening, and a shaft engaging seal defining said opening and forming a shell sealing seal with said shaft.

7. The bearing of claim 6 wherein said rotary bearing unit is a separately sealed unit having a separate seal with respect to said shaft.

8. A combined axial and rotary bearing for a terminal end of a shaft, said bearing including an outer shell including a lower bearing support, a rotary bearing unit, an axial bearing unit supporting said rotary bearing unit on said support for movement axially of said shaft, said rotary bearing unit receiving and supporting one end of said shaft for rotary movement, said shell being closed except for a shaft receiving opening, and a shaft engaging seal defining said opening and forming a shell sealing seal with said shaft, and wherein said rotary bearing unit is a separately sealed unit having a separate seal with respect to said shaft, said axial bearing unit including a pair of upwardly facing outer axial bearing races on said support, said outer axial bearing races having an included angle therebetween materially greater than 90 degrees and materially less than 180 degrees, anti-friction bearing elements riding on said outer axial bearing races, said rotary bearing unit including a housing forming member having a linear polygonal outer surface defining a plurality of pairs of adjacent inner axial bearing races, the lowermost pair of said inner axial bearing races being parallel to respective ones of said outer axial bearing races and being supported by said bearing elements for axial movement, said housing being selectively positionable relative to said support to present another pair of said inner axial bearing races to said support when the currently used pair of inner axial bearing races become worn.

9. The bearing of claim 8 wherein said housing has an inner surface defining an outer rotary bearing race, said polygonal outer surface defining means for presenting another pair of said inner axial bearing races to said support when said housing is rotated a pre-determined amount and for simultaneously shifting said outer rotary bearing race to change the loading thereon.

10. The bearing of claim 8 wherein said outer axial bearing races are formed separately of the remainder of said support and are replaceably mounted.

11. The bearing of claim 8 wherein said outer axial bearing races are formed separately of the remainder of said support and are replaceably mounted, each of said outer axial bearing races having a mounting which is rockable both axially and rotatably for alignment with opposing ones of said inner axial bearing races.

12. The bearing of claim 8 wherein said housing has an inner surface defining an outer rotary bearing race, said polygonal outer surface defining means for presenting another pair of said inner axial bearing races to said support when said housing is rotated a pre-determined amount and for simultaneously shifting said outer rotary bearing race to change the loading thereon, second anti-friction elements intermediate said housing and said shaft, and seals carried by said housing to separately seal said second anti-friction elements.

13. The bearing of claim 1 wherein said housing has an inner surface defining an outer rotary bearing race and wherein when said housing is rotated to present another pair of said inner axial bearing races to said support, there is simultaneously a shifting of said outer rotary bearing race to change the loading thereon, said rotary bearing being of the self-aligning type.

References Cited by the Examiner

UNITED STATES PATENTS

| | | | |
|---|---|---|---|
| 672,337 | 4/1901 | Stanley | 308—6 |
| 876,537 | 1/1908 | Garchey | 308—6 |
| 962,124 | 6/1910 | Carter | 308—59 |
| 1,377,670 | 5/1921 | Dallimore | 308—176 X |
| 1,458,187 | 6/1923 | Hudson | 308—183 X |
| 2,138,601 | 11/1938 | Herrmann | 308—207 X |
| 2,167,457 | 7/1939 | Leufuen | 308—59 X |
| 2,304,389 | 12/1942 | Young | 308—187.1 |
| 2,342,302 | 2/1944 | Rubissow | 308—21 |
| 2,506,525 | 5/1950 | Thomas | 308—207 |
| 2,556,317 | 6/1951 | Cook | 308—176 X |
| 2,639,204 | 5/1953 | Terry | 308—187.1 |
| 2,761,295 | 9/1956 | Davis | 64—1 |
| 2,866,670 | 12/1958 | Harris | 308—187.1 |
| 2,945,711 | 7/1960 | Dykman | 308—187.2 |
| 2,964,250 | 12/1960 | Asplund | 308—176 X |
| 2,976,090 | 3/1961 | McFeaters | 308—6 X |
| 3,070,039 | 12/1962 | Mohr | 308—245 X |

FOREIGN PATENTS 597,076   8/1959   Italy.

MARTIN P. SCHWADRON, *Primary Examiner.*
DAVID J. WILLIAMOWSKY, *Examiner.*
L. L. JOHNSON, *Assistant Examiner.*